United States Patent
Sakaue et al.

(10) Patent No.: US 12,456,742 B2
(45) Date of Patent: Oct. 28, 2025

(54) METHOD FOR OPERATING FUEL CELL

(71) Applicant: TORAY INDUSTRIES, INC., Tokyo (JP)

(72) Inventors: Tomohiro Sakaue, Otsu (JP); Daisuke Izuhara, Otsu (JP); Masaru Hashimoto, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 393 days.

(21) Appl. No.: 18/008,564

(22) PCT Filed: Jun. 1, 2021

(86) PCT No.: PCT/JP2021/020789
§ 371 (c)(1),
(2) Date: Dec. 6, 2022

(87) PCT Pub. No.: WO2021/251207
PCT Pub. Date: Dec. 16, 2021

(65) Prior Publication Data
US 2023/0231165 A1    Jul. 20, 2023

(30) Foreign Application Priority Data
Jun. 9, 2020 (JP) .................. 2020-099761

(51) Int. Cl.
*H01M 8/04701* (2016.01)
*H01M 4/90* (2006.01)
(Continued)

(52) U.S. Cl.
CPC ..... *H01M 8/04701* (2013.01); *H01M 4/9075* (2013.01); *H01M 8/04753* (2013.01);
(Continued)

(58) Field of Classification Search
CPC . H01M 2008/1095; H01M 2300/0082; H01M 4/9075; H01M 4/925;
(Continued)

(56) References Cited

U.S. PATENT DOCUMENTS

| 6,815,106 B1 | 11/2004 | Salvador et al. |
| 2002/0119357 A1 | 8/2002 | Baldauf et al. |

(Continued)

FOREIGN PATENT DOCUMENTS

| JP | 2003-504805 A | 2/2003 |
| JP | 2007-115413 A | 5/2007 |

(Continued)

OTHER PUBLICATIONS

Machine translation JP2013044032A (Year: 2013).*
(Continued)

*Primary Examiner* — Victoria H Lynch
(74) *Attorney, Agent, or Firm* — Birch, Stewart, Kolasch & Birch, LLP (57) ABSTRACT

The present invention provides a method of operating a fuel cell, which method enables a polymer electrolyte membrane to be humidified sufficiently under high-temperature conditions, and can obtain excellent power generation performance. The present invention is a method of operating a fuel cell including a membrane electrode assembly containing an electrolyte membrane, catalyst layers, and gas diffusion layers, the method including a step of setting the operating temperature of the fuel cell at 100° C. or more, wherein, in the step, the relative humidity of supply gas to be supplied to the fuel cell is 70% or more, and the back pressure of the supply gas is 330 kPa or more.

13 Claims, 3 Drawing Sheets

(51) Int. Cl.
   *H01M 8/04746* (2016.01)
   *H01M 8/04828* (2016.01)
   *H01M 8/1004* (2016.01)
   *H01M 8/1023* (2016.01)
   *H01M 8/10* (2016.01)

(52) U.S. Cl.
   CPC ..... *H01M 8/04835* (2013.01); *H01M 8/1004* (2013.01); *H01M 8/1023* (2013.01); *H01M 2008/1095* (2013.01); *H01M 2300/0082* (2013.01)

(58) Field of Classification Search
   CPC ......... H01M 8/04701; H01M 8/04753; H01M 8/04835; H01M 8/1004; H01M 8/1007; H01M 8/1023; H01M 8/1067; Y02E 60/50
   See application file for complete search history.

(56) References Cited

U.S. PATENT DOCUMENTS

| | | |
|---|---|---|
| 2007/0087256 A1 | 4/2007 | Hirashige et al. |
| 2009/0092879 A1* | 4/2009 | Kreidler ............. H01M 4/8871 429/479 |
| 2012/0264034 A1 | 10/2012 | Waki et al. |
| 2015/0004512 A1 | 1/2015 | Ikezoe et al. |
| 2017/0229721 A1* | 8/2017 | Baika ................ H01M 8/04225 |
| 2017/0338499 A1 | 11/2017 | Murata et al. |
| 2019/0229345 A1* | 7/2019 | Senoo ................ H01M 4/8807 |
| 2021/0380732 A1* | 12/2021 | Hirai ................ C08F 214/262 |

FOREIGN PATENT DOCUMENTS

| | | |
|---|---|---|
| JP | 2009-99491 A | 5/2009 |
| JP | 2009-238468 A | 10/2009 |
| JP | 2013-44032 A | 3/2013 |
| JP | 2017-208299 A | 11/2017 |
| WO | WO 2013/099480 A1 | 7/2013 |
| WO | WO 2020/075777 A1 | 4/2020 |

OTHER PUBLICATIONS

International Search Report, issued in PCT/JP2021/020789, PCT/ISA/210, dated Jul. 6, 2021.
Written Opinion of the International Searching Authority, issued in PCT/JP2021/020789, PCT/ISA/237, dated Jul. 6, 2021.
Extended European Search Report for European Application No. 21821097.9, dated Sep. 2, 2024.
Japanese Office Action for Japanese Application No. 2021-531510, dated Aug. 30, 2022, with an English translation.

* cited by examiner

METHOD FOR OPERATING FUEL CELL

TECHNICAL FIELD

The present invention relates to a method of operating a fuel cell including a membrane electrode assembly containing an electrolyte membrane, catalyst layers, and gas diffusion layers, wherein excellent power generation performance can be obtained even under high-temperature conditions by increasing the humidity and back pressure of supply gas during high-temperature operation.

BACKGROUND ART

A fuel cell is a kind of power generator from which electrical energy is taken out by oxidizing a fuel such as hydrogen or methanol electrochemically, and which has been noted as a clean energy supply source in recent years. Among others, a polymer electrolyte fuel cell allows a standard operating temperature of approximately 100° C., which is low, and a high energy density. Thus, in a wide range of applications, such fuel cells are expected to be used as relatively small-scale distributed power generation facilities and power generators for transportation vehicles such as automobiles and ships. In addition, such fuel cells are noted as power sources for small transportable devices and mobile devices, and are expected to be mounted as substitutes for secondary batteries such as nickel hydrogen batteries and lithium-ion batteries in mobile phones, personal computers, and the like.

A polymer electrolyte fuel cell is usually constituted by a unit as a cell in which a membrane electrode assembly (hereinafter referred to as an MEA for short) is sandwiched by separators, wherein this MEA is constituted by gas diffusion layers for supplying fuel gas and oxidizing gas to catalyst layers; anode and cathode catalyst layers in which a reaction responsible for power generation is caused; and a polymer electrolyte membrane as a proton conductor between the anode catalyst layer and the cathode catalyst layer.

Examples of characteristics required for the polymer electrolyte membrane include, first of all, high proton conductivity. In particular, it is required that the polymer electrolyte membrane has high proton conductivity even under high-temperature and low-humidity conditions. Conventionally, NAFION (registered trademark) (manufactured by DuPont Co., Ltd.) that is a perfluorosulfonic acid polymer has been widely used as a polymer electrolyte membrane. NAFION (registered trademark) exhibits high proton conductivity through a proton conduction channel due to the cluster structure, but has a problem with the proton conductivity under low-humidity conditions.

On the other hand, a hydrocarbon polymer electrolyte membrane that can be substituted for NAFION (registered trademark) has been actively developed in recent years. In particular among others, to enhance the proton conductivity, some approaches are being made to forming a microphase-separated structure by using a block copolymer composed of a hydrophobic segment and a hydrophilic segment, but still have a problem with the proton conductivity under low-humidity conditions. In view of such a situation, it is important that the water in a membrane electrode assembly (particularly the water content of the electrolyte membrane) is controlled in a fuel cell.

In addition, in order to make the performance of the polymer electrolyte fuel cell even higher, it is required to increase the operating temperature to more than 100° C. A fuel cell system can be made smaller by increasing the operating temperature to increase the catalytic activity and enhance the power generation performance and by increasing the heat discharge efficiency of the radiator. In addition, catalyst poisoning caused by a poisoning component such as carbon monoxide contained in the fuel gas can be decreased, and a performance decrease caused by impurities can be inhibited. However, there is a problem in that an increase in the operating temperature causes dehydration from the membrane electrode assembly, particularly the electrolyte membrane and decreases the proton conductivity, thereby failing to obtain sufficient performance. Accordingly, an electrolyte membrane material that can be used and a fuel cell system that can be operated at a high temperature, particularly in the temperature range of more than 100° C., have been developed.

In Patent Document 1, a separator structure that inhibits an increase in the gas pressure loss and an increase in the pressure difference between the anode and the cathode is described as a structure of a polymer electrolyte fuel cell that operates at a high temperature, that is, an operating temperature of 100° C. or more. Here, the structure is disclosed, in which the pressure loss in the cathode separator is decreased, and the energy efficiency is increased, by making the downstream cross-sectional area larger than the upstream cross-sectional area of the flow path in the gas flow direction in the cathode separator.

In addition, Patent Document 2 describes a membrane-electrode structure for a polymer electrolyte fuel cell, the structure including a proton-conductive membrane that has high proton conductivity, is less prone to swell under even high-temperature and high-humidity conditions, and has excellent dimensional stability. Disclosed here is a configuration that provides a membrane-electrode structure showing small dimensional change even with a high sulfonic acid equivalent by using an electrolyte membrane made of a branched polyarylene copolymer having a specific constituent unit.

Furthermore, Patent Document 3 describes a high-temperature type polymer electrolyte membrane fuel cell which operates substantially irrespective of the water in the fuel cell, and a method of operating the fuel cell. Disclosed here is a method in which an electrolyte retaining a self-dissociative compound such as phosphoric acid in the membrane is used in order to operate substantially irrespective of water, and which can mitigate the influence of the CO concentration of the process gas and the amount of water present in the cell by setting the operating temperature to 80 to 300° C. and the operating pressure to 0.3 bar to 5 bar.

PRIOR ART DOCUMENT

Patent Document

Patent Document 1: JP 2007-115413 A
Patent Document 2: JP 2009-238468 A
Patent Document 3: JP 2003-504805 A

SUMMARY OF THE INVENTION

Problems to be Solved by the Invention

However, the present inventors have discovered that, when a membrane electrode assembly containing such a solid polymer electrolyte membrane as described in Patent Document 1 or 2 is more humidified to maintain the proton conductivity during high-temperature operation, the water content of the supply gas is increased, thus the concentration of reaction gas, particularly oxidizing gas, is decreased, and the mass transport resistance is increased, thus causing a decrease in the performance. This point is not mentioned in any of the Documents.

In addition, an electrolyte according to Patent Document 3 has a concern that the electrolyte poisons catalyst strongly due to the strong acidity thereof and the power generation performance is decreased in a high-temperature range. Moreover, there is another problem that the proton conductivity is decreased as the electrolyte is used. Accordingly, to maintain high power generation performance in a high-temperature range, it is required to suitably humidify an electrolyte containing a solid high-molecular-weight polymer which does not contain a self-dissociative compound such as phosphoric acid in the membrane, and to inhibit a decrease in the concentration of the reaction gas in the vicinity of the electrode.

In view of the background of such a conventional technology, the present invention provides a method of operating a fuel cell, in which a polymer electrolyte membrane is humidified sufficiently even under high-temperature conditions and excellent power generation performance can be obtained.

Means for Solving the Problems

To solve such problems, the present invention adopts the following means.

That is, a method of operating a fuel cell according to the present invention is characterized in that the fuel cell includes a membrane electrode assembly (MEA) containing an electrolyte membrane, catalyst layers, and gas diffusion layers, and the method includes a step of setting the operating temperature of the fuel cell at 100° C. or more, wherein, in the step, the relative humidity of supply gas to be supplied to the fuel cell is 70% or more, and the back pressure of the supply gas is 330 kPa or more.

Further, a fuel cell system according to the present invention is characterized in that the fuel cell system is used in the method of operating a fuel cell according to the present invention, and the fuel cell system includes a fuel cell including a membrane electrode assembly containing an electrolyte membrane, catalyst layers, and gas diffusion layers; a humidifier for humidifying supply gas to be supplied to the fuel cell; and a compressor for increasing the back pressure of the supply gas.

Effect of the Invention

The present invention can provide a method of operating a fuel cell having high power generation performance under high-temperature conditions.

MODE FOR CARRYING OUT THE INVENTION

The present invention will be described below in detail.
[Membrane Electrode Assembly]
A membrane electrode assembly (MEA) according to the present invention contains an electrolyte membrane, catalyst layers arranged on both sides of the electrolyte membrane, gas diffusion layers each arranged so as to be in contact with the opposite side of the catalyst layer from the electrolyte membrane side.
(Electrolyte Membrane)

An electrolyte membrane contained in the membrane electrode assembly according to the present invention is not particularly limited, and is preferably an electrolyte membrane containing a solid polymer electrolyte. The solid polymer electrolyte is preferably an electrolyte containing a proton-conductive polymer.

In the present invention, a perfluorosulfonic acid polymer, which has been conventionally and widely used, may be used as the proton-conductive polymer, but it is preferable to use a polymer electrolyte membrane containing a hydrocarbon polymer which has been developed more actively in recent years. The polymer electrolyte membrane containing the hydrocarbon polymer is an electrolyte membrane that can be substituted for a perfluorosulfonic acid polymer, from the viewpoints of being inexpensive, inhibiting fuel crossover, having excellent mechanical strength, and having a high softening point to withstand use at high temperature.

In particular among others, in order to enhance proton conductivity under low humidification, some approaches are being made for forming a microphase-separated structure by using a block copolymer composed of a hydrophobic segment and a hydrophilic segment. Using a polymer having such a structure causes hydrophobic interaction, aggregation, and the like among the hydrophobic segments, thereby enhancing the mechanical strength, and causes electrostatic interaction and the like among the ionic groups in the hydrophilic segments to allow clustering to progress and to form ion conduction channels, thereby enhancing the proton conductivity.

As mechanisms for proton transfer in such an electrolyte membrane, the vehicle mechanism in which hydrated protons, or hydronium ions, themselves transfer; and the Grotthus mechanism in which protons bound to a substrate hop to another substrate, have been proposed. Under low humidification conditions having fewer water molecules, the transfer by sulfonic groups hopping based on the Grotthus mechanism is predominant.

Under these situations, in the case of a fluorine-based electrolyte membrane or the like, the acid dissociation constant of sulfonic groups contained in a molecular structure is small and protons dissociate more easily, thus proton conduction by the hopping progress easily. On the other hand, in the case of a polymer electrolyte membrane containing a hydrocarbon polymer, the acid dissociation constant of sulfonic groups in a molecular is larger than that in the fluorine-based electrolyte membrane and protons are difficult to dissociate, thus the decrease in proton conductivity under low humidification conditions larger than that in the fluorine-based electrolyte membrane. As used herein, the acid dissociation constant is one of the indexes for expressing the acid strength of a substance, and is represented by a negative common logarithm pKa of the equilibrium constant in the dissociation reaction in which protons are discharged from an acid.

In the present invention, the hydrocarbon polymer is preferably an aromatic hydrocarbon polymer. Specific examples of the aromatic hydrocarbon polymers include polymers having an aromatic ring in the main chain, such as polysulfone, polyethersulfone, polyphenylene oxide, polyaryleneether polymer, polyphenylene sulfide, polyphenylene sulfide sulfone, polyparaphenylene, polyarylene polymer, polyarylene ketone, polyether ketone, polyarylene phosphine phoxide, polyetherphosphine phoxide, polybenzoxazole, polybenzothiazole, polybenzimidazole, aromatic polyamide, polyimide, polyetherimide, and polyimidesulfone.

The polyethersulfone is a general term for a polymer containing an ether bond and a sulfone bond in the molecular chain thereof. In addition, the polyether ketone is a general term for a polymer containing an ether bond and a ketone bond in the molecular chain thereof. Examples of the polyether ketones include polyether ketone ketone, polyetherether ketone, polyetherether ketone ketone, polyether ketone ether ketone ketone, polyether ketone sulfone, and the like, and are not limited to any specific polymer structure.

Among these aromatic hydrocarbon polymers, polymers such as polysulfone, polyethersulfone, polyphenylene oxide, polyaryleneether polymer, polyphenylene sulfide, polyphenylene sulfide sulfone, polyarylene ketone, polyether ketone, polyarylene phosphine phoxide, and polyetherphosphine phoxide are preferable from the viewpoints of mechanical strength, physical durability, processability, and hydrolysis resistance, and polyether ketone is more preferable. As a polyether ketone, a block copolymer composed of a segment having a benzophenone structure having an ionic group and a segment having a dioxolane structure is still more preferable.

A method of synthesizing an aromatic hydrocarbon polymer is not particularly limited as long as the method can satisfy the above-mentioned characteristics and requirements. Examples of such a method include a method described in *Journal of Membrane Science* (*Journal of Membrane Science*), 197, 2002, pp. 231-242.

As one example, preferable polymerization conditions for synthesizing an aromatic hydrocarbon polymer through polycondensation reaction are mentioned below. The polymerization can be performed in the temperature range of from 0 to 350° C., preferably in the temperature of from 50 to 250° C. At less than 0° C., the reaction tends not to progress sufficiently, and at more than 350° C., the polymer tends to start decomposing. The reaction is preferably performed in a solvent. Examples of a solvent that can be used include aprotic polar solvents such as N,N-dimethylacetamide, N,N-dimethylformamide, N-methyl-2-pyrrolidone, dimethylsulfoxide, sulfolane, 1,3-dimethyl-2-imidazolidinone, and hexamethylphosphonetriamide, and are not limited to these as long as the solvent can be used as a stable solvent in aromatic nucleophilic substitution reaction. These organic solvents may be used alone or as a mixture of two or more kinds thereof.

In cases where the condensation reaction is carried out in a solvent, the monomer is preferably blended such that concentration of the resulting polymer is 5 to 50 wt %. When the polymer concentration is lower than 5 wt %, the degree of polymerization tends less to increase. When the polymer concentration is higher than 50 wt %, the viscosity of the reaction system is too high, and the post-treatment of the reactant tends to become difficult.

In the present invention, the aromatic hydrocarbon polymer may have an ionic group. Examples of a method of introducing an ionic group into an aromatic hydrocarbon polymer include a method in which a monomer having an ionic group is used for polymerization; and a method in which an ionic group is introduced through polymeric reaction. In the method in which a monomer having an ionic group is used for polymerization, a monomer having an ionic group may be used in a repeating unit thereof. It is possible to introduce a suitable protecting group if necessary and carry out the polymerization, and then deprotect the protecting group.

As for the method in which an ionic group is introduced, examples of a method of sulfonating an aromatic ring, that is, a method of introducing sulfonic group include a method described in, for example, JP H02-016126 A, JP H02-208322 A, or the like.

Specifically, for example, an aromatic ring can be sulfonated by reacting with a sulfonating agent such as chlorosulfonic acid in a solvent such as chloroform, or by reacting in concentrated sulfuric acid or fuming sulfuric acid. The sulfonating agent is not limited particularly as long as the agent sulfonates an aromatic ring. Other than the above-mentioned agents, sulfur trioxide or the like can be used. In cases where this method is used to sulfonate an aromatic ring, the degree of sulfonation can be controlled easily by the amount of a sulfonating agent, the reaction temperature, and the reaction time. A sulfonimide group can be introduced into an aromatic polymer, for example, by a method in which a sulfonic group is reacted with a sulfonamide group.

The ionic group is preferably a functional group having negative charge, and in particular, is preferably a functional group having a proton exchange ability. As for such a functional group, a sulfonic group, sulfonimide group, sulfate group, phosphonic group, phosphoric acid group, or carboxylic group are preferably used. Here, the sulfonic group means a group represented by the following general formula (f1), the sulfonimide group means a group represented by the following general formula (f2) [in the general formula (f2), R represents any organic group], the sulfate group means a group represented by the following general formula (3), the phosphonic group means a group represented by the following general formula (f4), the phosphoric group means a group represented by the following general formula (f5) or (f6), and the carboxylic group means a group represented by the following general formula (7).

[Chemical Formula 1]

(f1)

(f2)

(f3)

(f4)

-continued

Such an ionic group include a salt of the above-mentioned functional groups (f1) to (f7). Examples of cations that form the salt include any metal cation and NR4+(R is any organic group). In the case of a metal cation, the valence is not particularly limited. Specific examples of preferable metal ions include ions of Li, Na, K, Rh, Mg, Ca, Sr, Ti, Al, Fe, Pt, Rh, Ru, Ir, and Pd. Among these, ions of Na, K, and Li, which are inexpensive and can easily undergo proton exchange, are preferably used for a block copolymer to be used in the present invention.

Two or more of these ionic groups can be contained in a polymer, and the combination thereof can be determined suitably depending on the polymer structure and the like. Among these, a sulfonic group, a sulfonimide group, or a sulfate group is more preferably used from the viewpoint of high proton conductivity, and containing a sulfonic group is most preferable from the viewpoint of raw material cost.

An electrolyte membrane according to the present invention desirably has a softening point of 120° C. or more. When a softening point is less than 120° C., the mechanical strength of the electrolyte membrane at an operating temperature of more than 100° C. decreases, and in some cases, deterioration such as creep or membrane breakage are caused. To maintain the durability under high-temperature conditions, an electrolyte membrane having a softening point of 120° C. or more is preferably used. In the present invention, the softening point is defined as a temperature at which the slope of storage elastic modulus exhibits an inflection point in the measurement of the dynamic viscoelasticity of the electrolyte membrane.

As a polymer electrolyte membrane having such a high softening point, a polymer electrolyte membrane containing the above-mentioned hydrocarbon polymer is preferably used. A common perfluorosulfonic acid polymer has a softening point of approximately 80° C., and in some cases, does not have sufficient mechanical strength at an operating temperature of more than 100° C. On the other hand, since a hydrocarbon polymer has a higher softening point, it is easy to produce an electrolyte membrane having a softening point of 120° C. or more. Thus, a polymer electrolyte membrane composed of a hydrocarbon polymer is more suitably used as an electrolyte membrane contained in a fuel cell to be operated under high-temperature conditions.

An electrolyte membrane according to the present invention preferably has an oxygen gas permeability coefficient of $1.0 \times 10^{-9}$ cm$^3$ cm/cm$^2$·sec·cmHg or less at 90° C. and 80% RH, more preferably $5.0 \times 10^{-10}$ cm$^3$·cm/cm$^2$·sec·cmHg or less, still more preferably $1.0 \times 10^{-10}$ cm$^3$·cm/cm$^2$·sec·cmHg or less. The high oxygen gas permeability of the electrolyte membrane increases the amount of hydrogen peroxide that is generated by chemical reaction between the oxygen which permeated the membrane and the hydrogen supplied to the counter electrode, and that causes the chemical deterioration of the membrane. In particular, under high-temperature conditions, the saturation solubility of gas into the electrolyte membrane usually tends to decrease, but the diffusion rate of the gas in the electrolyte membrane increases significantly, and as a result, the gas permeability coefficient often increases. To maintain sufficient chemical durability at an operating temperature of more than 100° C., if the oxygen gas permeability coefficient is $1.0 \times 10^{-9}$ cm$^3$·cm/cm$^2$·sec·cmHg or less at 90° C. and 80% RH, the decrease in the chemical durability, which is caused by the generation of hydrogen peroxide, can be prevented. An electrolyte membrane according to the present invention preferably has a hydrogen gas permeability coefficient of $5.0 \times 10^{-9}$ cm$^3$ cm/cm$^2$·sec·cmHg or less at 90° C. at 80% RH, more preferably $1.0 \times 10^{-9}$ cm$^3$·cm/cm$^2$·sec·cmHg or less. The high hydrogen gas permeability of the electrolyte membrane increases the amount of hydrogen peroxide that is generated by chemical reaction between the hydrogen which permeated the membrane and the oxygen supplied to the counter electrode, and that causes the chemical deterioration of the membrane. In particular, under high-temperature conditions, the saturation solubility of gas into the electrolyte membrane usually tends to decrease, but the diffusion rate of the gas in the electrolyte membrane increases significantly, and as a result, the gas permeability coefficient often increases. To maintain sufficient chemical durability at an operating temperature of more than 100° C., if the hydrogen gas permeability coefficient is $5.0 \times 10^{-9}$ cm$^3$·cm/cm$^2$·sec·cmHg or less at 90° C. and 80% RH, the decrease in the chemical durability, which is caused by the generation of hydrogen peroxide, can be prevented.

In the present invention, the gas permeability coefficient of the electrolyte membrane for each of oxygen and hydrogen at 90° C. and 80% RH is measured in accordance with the following conditions. The gas permeability coefficient is calculated as an average from three tests.

Device: a differential-pressure type gas permeation analysis system GTR-30AX (manufactured by GTR TEC Corporation)

Temperature and relative humidity: 90° C. and 80% RH

Test gases: oxygen and hydrogen

Test gas pressure: 101.3 kPa (atmospheric pressure) as the total pressure of the gas containing water vapor 45.2 kPa as the partial pressure of each measurement gas in the measurement at 90° C. and 80% RH Gas permeation area: 3.14 cm$^2$ (a circular sample having a diameter of 2.0 cm), with masking Number of measurements, n: 3 (measured using the same sample)

A polymer electrolyte used in the present invention is preferably a hydrocarbon polymer because the polymer tends to decrease the gas permeability coefficient of the electrolyte membrane. In addition, to obtain sufficient mechanical strength and gas barrier properties, the polymer electrolyte is preferably an aromatic hydrocarbon polymer having crystallinity. Here, "having crystallinity" means having crystallizable property when the temperature is raised, or being already crystallized.

The presence or absence of the crystallinity is confirmed by differential scanning calorimetry (DSC) or wide-angle X-ray diffraction. In the present invention, it is preferable that a membrane formed exhibits a crystallization calorie of 0.1 J/g or more as measured by differential scanning calorimetry, or a degree of crystallinity of 0.5% or more as measured by wide-angle X-ray diffraction. That is, in cases where no crystallization peak is recognized by differential scanning calorimetry, the polymer electrolyte is considered to be already crystallized or to be noncrystalline. In cases where the polymer electrolyte is already crystallized, the degree of crystallinity is 0.5% or more by wide-angle X-ray diffraction.

The thickness of the electrolyte membrane is not particularly limited. The thickness of more than 20 μm tends to decrease power generation performance, and the thickness of less than 5 μm tends to decrease durability and handling properties. Thus, the thickness is preferably 5 μm or more and 20 μm or less. In cases where the electrolyte membrane has a thickness of less than 5 μm, the water amount retained in the membrane is small, the drying of the membrane proceeds early under high-temperature conditions, and, in some cases, the power generation performance decreases.

(Catalyst Layer)

A catalyst layer according to the present invention is constituted by an ionic conductor and catalyst-supporting particles in which a catalyst is supported on a support. Examples of catalysts to be preferably used include, but are not limited to, noble metal species such as platinum, gold, ruthenium, and iridium, which exhibit high activity in oxidation and reduction reactions. The support is preferably carbon particles or oxide particles that have electroconductivity and high chemical stability and have a high surface area, particularly preferably metal oxide particles. Examples of carbon particles include acetylene black, ketjen black, vulcan carbon, or the like. Examples of metal oxide particles include tin oxide, titanium oxide, or the like.

In the present invention, it is particularly preferable to use a metal oxide support that is chemically stable under an oxidative atmosphere at 100° C. or more. Carbon particles are promoted to be oxidized in an oxidative atmosphere at 100° C. or more, and, in some cases, accelerates the detachment of catalyst particles supported on the carbon particles and deterioration due to sintering. Use of a metal oxide support can inhibit deterioration of the catalyst support under high-temperature operation conditions, and maintain high power generation performance.

(Gas Diffusion Layer)

A gas diffusion layer according to the present invention contains a carbon sheet and a microporous layer. That is, the gas diffusion layer can be produced by forming a microporous layer on a carbon sheet.

The microporous layer is constituted by a water-repellent resin, such as PTFE, and an electroconductive filler. The electroconductive filler is preferably carbon powder. Examples of carbon powders include carbon blacks such as furnace black, acetylene black, lamp black, and thermal black; graphites such as flake graphite, scaly graphite, earthy graphite, artificial graphite, expanded graphite, and flaky graphite; carbon nanotube; linear carbon; milled fiber of carbon fiber; and the like. Among these, carbon black is more preferably used as carbon powder that is a filler, and acetylene black is preferably used because of containing impurities in a smaller amount.

In the present invention, it is preferable that the amount of a water-repellent resin used in the microporous layer is decreased in terms of increasing the water-holding capacity. In addition, using a hydrophilic resin having bonding properties, instead of a water-repellent resin, can further enhance the water-holding capacity of the membrane electrode assembly.

It is important that the carbon sheet is porous in view of high gas diffusivity for diffusing gas supplied from a separator into a catalyst layer and high water discharge ability for discharging water generated through electrochemical reaction into a separator. Furthermore, the carbon sheet according to the present invention preferably has high electroconductivity to take out generated electric current. Accordingly, a porous substance having electroconductivity is preferably used to obtain the carbon sheet. More specifically, the porous substance used to obtain the carbon sheet is preferably, for example, a porous substance containing carbon fiber, such as carbon-fiber woven fabric, carbon paper, or carbon-fiber nonwoven fabric, or a foamed carbonaceous porous substance containing carbon fiber.

Among these, a porous substance containing carbon fiber is preferably used to obtain the carbon sheet, because of having excellent corrosion resistance. Furthermore, carbon paper formed by bonding a carbon-fiber paper material with carbide (a bonding material) is preferably used because of having property to absorb a dimensional change in the direction (thickness direction) perpendicular to a surface of the electrolyte membrane, that is, because of having excellent "springiness".

(Method of Producing Membrane Electrode Assembly)

Methods of producing the above-mentioned membrane electrode assembly (MEA) containing an electrolyte membrane, catalyst layers, and gas diffusion layers are roughly classified into the following: a method (I) in which gas diffusion electrodes (GDE), in each of which a catalyst layer is formed on one surface of a gas diffusion layer, are produced, and the produced gas diffusion electrodes (GDE) are laminated with the electrolyte membrane; and a method (II) in which a catalyst layer-laminated electrolyte membrane (CCM) is produced, and the produced electrolyte membrane (CCM) is laminated with gas diffusion layers.

Figure 2:
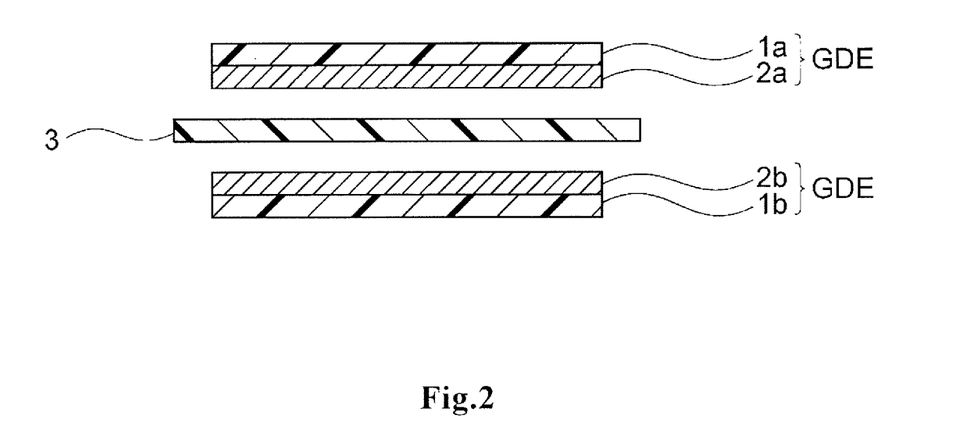
FIG. 2 is a schematic cross-sectional view for describing a method of producing a membrane electrode assembly produced in Example 2 in the present invention.

FIG. 2 is a schematic cross-sectional view for describing the above-mentioned method (I) (the below-mentioned method in Example 2).

In the method (I), two gas diffusion electrodes (GDE) are first produced, in which an anode catalyst layer 2a and a cathode catalyst layer 2b are formed on the respective microporous layer-formed surfaces of an anode gas diffusion layer 1a and a cathode gas diffusion layer 1b as gas diffusion layers. Then, an electrolyte membrane is arranged such that it is in direct contact with the catalyst layer-formed surface of each of the anode and cathode gas diffusion electrodes, and joined each other.

Figure 1:
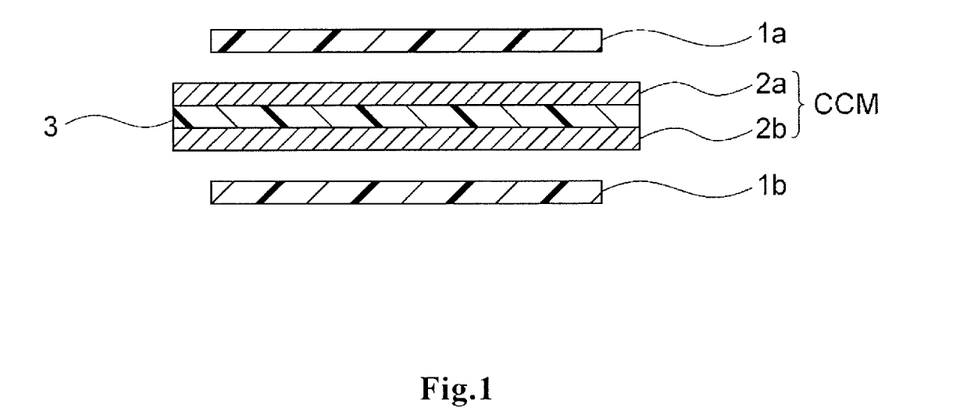
FIG. 1 is a schematic cross-sectional view for describing a method of producing a membrane electrode assembly produced in Example 1 in the present invention.

FIG. 1 is a schematic cross-sectional view for describing the above-mentioned method (II) (the below-mentioned method in Example 1).

In the method (II), a catalyst layer-coated electrolyte membrane (CCM) is first produced, in which an anode catalyst layer 2a and a cathode catalyst layer 2b are laminated on both surfaces of an electrolyte membrane 3. Then, anode and cathode electrode base materials (an anode gas diffusion layer 1a and a cathode gas diffusion layer 1b) are arranged such that these base materials are in direct contact with the catalyst layer-formed surfaces of the CCM, and joined.

The method of joining the electrolyte membrane, catalyst layers, and gas diffusion layers is not particularly limited, and a known method (for example, a chemical plating method described in Denki Kagaku, 1985, 53, p. 269; a hot press joining method for a gas diffusion electrode, described in Electrochemical Science and Technology (Electrochemical Science and Technology) compiled by J. Electrochem. Soc. (J. Electrochem. Soc.), 1988, 135, 9, p. 2209; or the like) can be applied.

In cases where the electrolyte membrane, the catalyst layers, and the gas diffusion layers are pressed to be integrated, the temperature and the pressure may be suitably selected depending on the thickness and water content of the electrolyte membrane, the catalyst layers, and the electrode base material. Specific examples of pressing methods include roll pressing in which pressure and clearance are prescribed, flat plate pressing in which pressure is prescribed, and the like. These methods are preferably performed in the range of from 0° C. to 250° C., from the viewpoints of industrial productivity, the inhibition of thermal decomposition of a polymer material having an ionic group, and the like. The pressing is preferably as weak as possible from the viewpoint of protecting the electrolyte membrane and the electrodes. In the flat plate pressing, the pressure is preferably 10 MPa or less. Superposing the electrodes and the electrolyte membrane into a fuel cell without integrating them by a pressing step is one preferable option from the viewpoint of preventing a short circuit between the anode electrode and the cathode electrode. In cases where a fuel cell obtained through this method generates power repeatedly, the deterioration of the electrolyte membrane, which is estimated to be caused by short-circuited points, tends to be inhibited, thereby providing a fuel cell with good durability.

Specifically, it is preferable that an electrolyte membrane, gas diffusion layers, and catalyst layers are laminated as above-mentioned and as shown in FIG. 1 and FIG. 2, and the resulting laminate is then pressed at a given temperature and pressure to produce an MEA. Such lamination and pressing may be performed at both surfaces simultaneously, or may be performed at one surface after the other.

Examples of methods of producing a membrane electrode assembly continuously include a method in which a roll-shaped electrolyte membrane is produced and then laminated with catalyst layers and/or gas diffusion layers, and the resulting laminate is subsequently pressed at a given temperature and pressure. When a film-shaped member such as a base material, an electrolyte membrane, or an electrolyte membrane with a base material is laminated, each of the film-shaped members is preferably laminated while being subjected to tension, and the tension can be varied, for example, by a method in which a tension cut is provided between steps. Examples of a tension cut include a roll having a motor, a clutch, a brake, and the like mounted thereon, and the tension cut preferably includes a detection means for detecting the tension applied to the film. Examples of a roller to be used for a tension cut include a nip roller, a suction roller, a combination of a plurality of rollers, and the like. In the case of the nip roller is used, a film is sandwiched between rollers, and the feed speed of the film is controlled with a frictional force generated by the sandwiching pressure, thereby the pressure applied to the film can be varied before and after the rollers. In the case of the suction roller, the inside of a roller having many holes opened in the surface thereof or a roller formed by rolling wires in net-like or drainboard-like shape is aspirating to provide negative pressure, thereby sucking the film-shaped member. The feed speed of the film-shaped member is controlled by a frictional force generated by the sucking force, which results in varying the pressure applied to the film-shaped member before and after the roller.

[Fuel Cell Unit]

Figure 3:
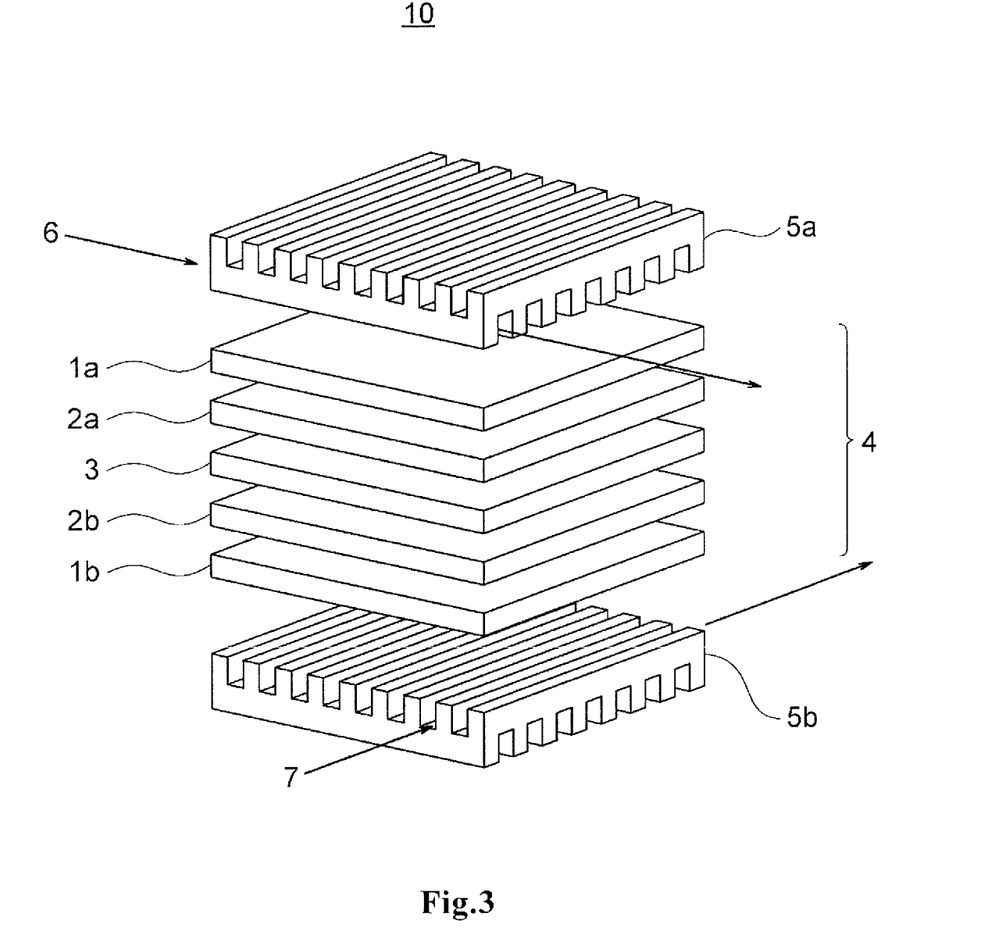
FIG. 3 is a perspective view for describing the structure of a fuel cell unit in the present invention.

FIG. 3 is a perspective view for describing the structure of a fuel cell unit 10 in the present invention.

The membrane electrode assembly 4 produced as mentioned above is joined with an anode separator 5*a* and a cathode separator 5*b* to constitute a fuel cell unit 10. A plurality of grooves as flow paths, through which hydrogen gas 6 passes, are formed on the surface of the anode separator 5*a*, which surface is joined with the anode gas diffusion layer. The hydrogen gas 6 supplied into the grooves of the anode separator 5*a* passes through the anode gas diffusion layer 1*a*, reaches the anode catalyst layer 2*a*, and is used for oxidation reaction. In addition, a plurality of grooves as flow paths, through which air or oxygen gas 7 passes, are formed on the surface of the cathode separator 5*b*, which surface is joined with the cathode gas diffusion layer 1*b*. The air or oxygen gas 7 supplied into the grooves of the anode separator 5*b* passes through the cathode gas diffusion layer 1*b*, reaches the cathode catalyst layer 2*b*, and is used for reduction reaction.

[Fuel Cell System]

Figure 4:
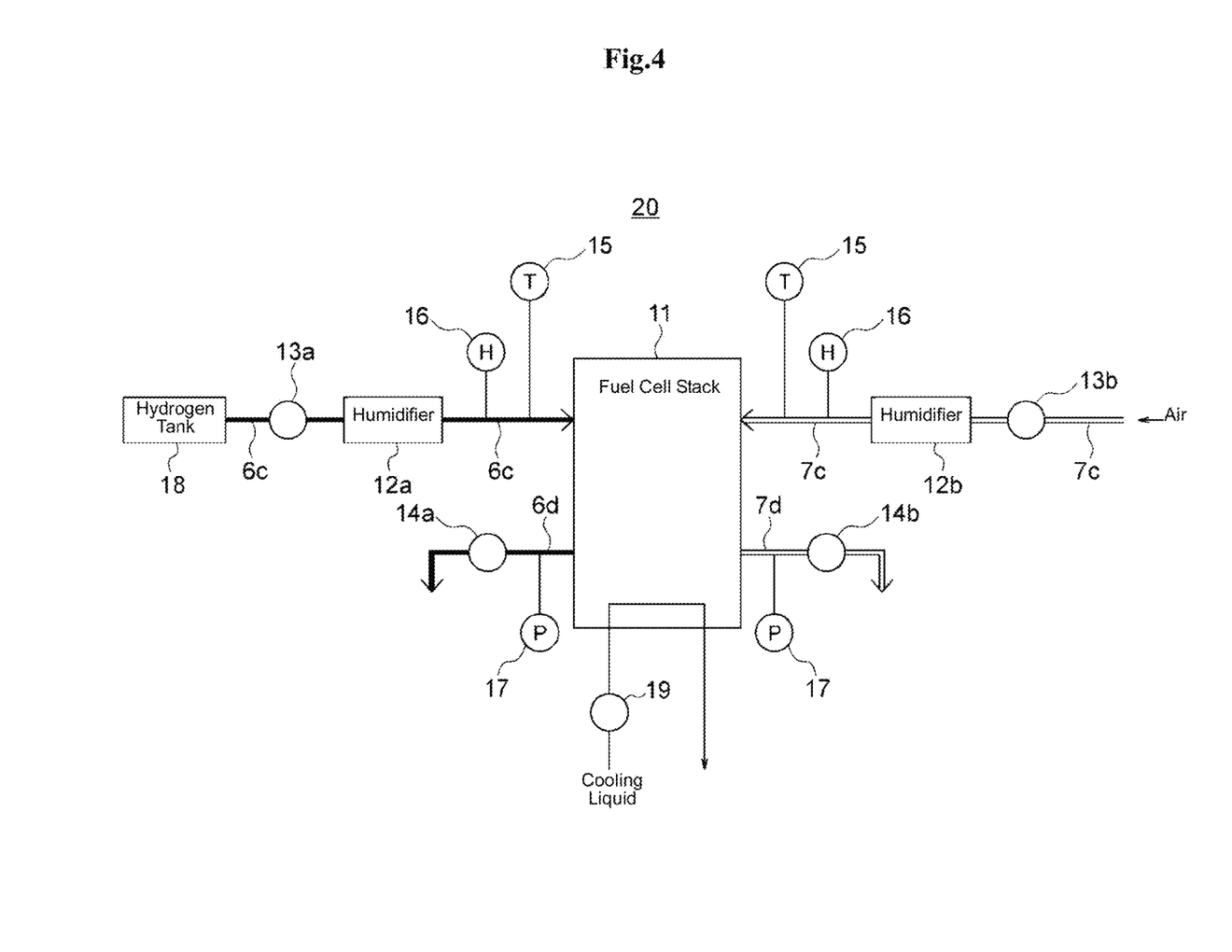
FIG. 4 is a schematic diagram for describing a fuel cell system in the present invention.

FIG. 4 is a schematic diagram for describing a fuel cell system 20 in the present invention.

The fuel cell system 20 is constituted mainly by a fuel cell stack 11, humidifiers 12*a* and 12*b*, compressors 13*a* and 13*b*, back-pressure valves 14*a* and 14*b*, pipes connecting these, and various sensors. The fuel cell units 10 (FIG. 3) produced as mentioned above are connected alternately with cooling plates (not depicted) and integrated to constitute a fuel cell stack 11.

(Humidifier)

The humidifier is used in order to humidify supply gas for the fuel cell. The humidifier is arranged upstream a gas supply inlet of the fuel cell stack 11. At this time, the electrolyte membrane can be suitably humidified at any operating temperature by controlling the amount of water supplied from the humidifier depending on the operating temperature of the fuel cell. Examples of a method for humidification include a method (bubbler method) in which supply gas is passed through an aqueous layer containing heated water; a method (water vapor addition method) in which water vapor is directly added to and mixed in supply gas; and the like. In the operating method according to the present invention, the operating temperature of the fuel cell is more than 100° C., and gas supplied to the humidifier has also a high temperature equal to or greater than the operating temperature. Thus, it is preferable that the humidifier can humidify supply gas sufficiently even in the temperature range of 100° C. or more, and has high-temperature durability.

(Compressor)

The compressor is used in order to increase the pressure of supply gas for the fuel cell. The compressor compresses supply gas, particularly cathode gas (air or oxygen gas), and supplies the high-pressurized gas to the fuel cell. In cases where air is used as the cathode gas and air is sucked always from outside of the fuel cell system, the compressor, which compresses the cathode gas, is arranged between the air suction inlet and the gas supply inlet of the fuel cell stack. In a configuration in which supply gas is circulated in the fuel cell system, the compressor is arranged during the pathway from the gas discharge outlet toward the gas supply inlet.

(Cooling Liquid)

The cooling liquid is used in order to control the operating temperature of the fuel cell. The cooling liquid is supplied to a cooling plate via a cooling liquid circulation pump, absorbs heat generated in the fuel cell stack during power generation, and radiates the heat at a radiator (not depicted). In an operating method according to the present invention, the operating temperature of the fuel cell is more than 100° C., and the cooling liquid has also a high temperature equal to the operating temperature. Thus, it is preferable that the cooling liquid can cool the fuel cell stack sufficiently even in the temperature range of 100° C. or more, and has low vapor pressure.

[Method of Operating Fuel Cell]

A method of operating a fuel cell according to the present invention is characterized in that the above-mentioned fuel cell system is used, and that the method includes a step of setting the operating temperature of the fuel cell at 100° C. or more, wherein in this step, the relative humidity of supply gas to be supplied to the fuel cell is set so as to be 70% or more, and the back pressure of the supply gas is set so as to be 330 kPa or more.

In the present invention, the relative humidity (% RH) means a water vapor pressure with respect to a saturated water vapor pressure at a certain temperature, and the back pressure means the pressure of supply gas at the outlet of the fuel cell stack. In addition, a pressure in the present invention means an absolute pressure.

A specific method of operating a fuel cell according to the present invention will be described below with reference to FIG. 4 (a fuel cell system 20).

In the present invention, the operating temperature of each fuel cell unit 10 (FIG. 3) in the fuel cell stack 11 is increased to 100° C. or more, for example, by heating from outside of the fuel cell stack 11 using a heater or the like. The temperature of the fuel cell unit 10 can be set at 100° C. or more by measuring the temperature by a method using a thermocouple embedded in the cell; a method using a thermography (an infrared temperature image device), or the like, and by regulating the heating temperature of a heater or the like. In the fuel cell stack 11, there may be a temperature distribution, but it is necessary to set all the cell units 10 in the fuel cell stack 11 at 100° C. or more. In the present invention, the operating temperature of the fuel cell unit 10 has only to be 100° C. or more, but is preferably set at 105° C. or more, more preferably 110° C. or more, still more preferably 115° C. or more. In addition, the upper limit of the operating temperature of the fuel cell unit 10 is usually 150° C. or less, and is preferably set at 140° C. or less, still more preferably 130° C. or less. Any of the upper limit values and lower limit values of the operating temperature may be combined.

Hydrogen gas as fuel gas is stored in a hydrogen tank 18. The hydrogen gas is supplied to the compressor 13a from the hydrogen tank 18 via a hydrogen gas supply pipe 6c. In the compressor 13a, the hydrogen gas is compressed to be high-pressurized. The high-pressurized hydrogen gas is supplied to the humidifier 12a. At this time, the hydrogen gas is humidified so as to have a relative humidity of 70% or more with respect to the temperature of the fuel cell unit 10. The temperature of the hydrogen gas is set to be raised to a temperature equal to or higher than the dew point corresponding to the amount of humidification. In addition, whether the humidity of the hydrogen gas is set to a predetermined amount of humidification is confirmed by a humidity sensor 16. Then, the humidified hydrogen gas is supplied from the hydrogen gas supply inlet of the fuel cell stack 11 into inside of the fuel cell stack 11, and supplied to the anode separator 5a (FIG. 3) of each fuel cell unit.

The hydrogen gas 6 not used in the fuel cell unit is discharged from the hydrogen gas discharge outlet of the fuel cell stack 11 via the hydrogen gas discharge pipe 6d. At this time, the back pressure of the hydrogen gas, which is measured at the outlet of the fuel cell stack, is set so as to be 330 kPa or more. The back pressure of the hydrogen gas can be measured using a pressure sensor 17 arranged in the hydrogen gas discharge pipe 6d, and can be regulated to be a predetermined back pressure by the compressor 13a and the back-pressure valve 14a.

On the other hand, air as oxidizing gas is introduced through the air suction inlet, and supplied to the compressor 13b via an air supply pipe 7c. In the compressor 13b, the air is compressed to be high-pressurized. The high-pressurized air is supplied to the humidifier 12b. At this time, the air is humidified to have a relative humidity of 70% or more with respect to the temperature of the fuel cell unit 10. The temperature of the air is set to be raised to a temperature equal to or higher than the dew point corresponding to the amount of humidification. In addition, whether the humidity of air is set to a predetermined amount of humidification is confirmed by a humidity sensor 16. Then, the humidified air is supplied form the air supply inlet of the fuel cell stack 11 into inside of the fuel cell stack 11, and supplied to the cathode separator 5b (FIG. 3) of each fuel cell unit.

The air 7 not used in the fuel cell unit is discharged from the air discharge outlet of the fuel cell stack 11 via the air discharge pipe 7d. At this time, the back pressure of the air, which is measured at the outlet of the fuel cell stack, is set so as to be 330 kPa or more. The back pressure of the air can be measured using a pressure sensor 17 arranged in the air discharge pipe 7d, and can be regulated to a predetermined back pressure by using the compressor 13b and the back-pressure valve 14b.

In the fuel cell stack 20, heat is generated by the power generation of the fuel cells. In order to collect this heat, cooling liquid is supplied to the fuel cell stack 20 by a cooling liquid circulation pump 19. The cooling water supplied to the fuel cell stack 20 passes through a cooling plate (not depicted) arranged between the fuel cell units 10, and the like, and collects heat to be discharged as warm water to outside of the fuel cell stack 20. The collected discharged heat can be further utilized effectively.

That is, in the present invention, when the fuel cell during operation has a high temperature of 100° C. or more, water vapor is supplied in an amount enough to suitably humidify the membrane electrode assembly, particularly the electrolyte membrane, by setting the relative humidity of the supply gas at 70% or more. Furthermore, also when the water vapor pressure is thus increased, a sufficient amount of reaction gas can be supplied to the electrodes of the membrane electrode assembly by increasing the back pressure of the supply gas to a specific value or higher. By this, an increase in the proton conduction resistance of the electrolyte membrane and an increase in the mass transport resistance during the electrode reaction can be inhibited while enhancing the catalytic activity and the heat discharge efficiency, thereby realizing the high performance of the fuel cell.

During the operation of a fuel cell, in the fuel cell unit 10 (FIG. 3), the hydrogen gas 6 is supplied to the anode side and air or oxygen gas 7 is supplied to the cathode side. At the anode electrode, hydrogen is reduced to generate protons and electrons. The protons that have conducted through the electrolyte membrane and the electrons that have conducted through an external circuit react with oxygen at the cathode electrode to generate water. The amounts of the hydrogen and the oxygen consumed at the anode electrode and at the cathode electrode respectively are in proportion to the amount of electric current flowing in the external circuit. The insufficient supply of the hydrogen and the oxygen to near the electrodes results in mass transport resistance which is a factor for a decrease in the performance.

As mentioned above, the water in the membrane contributes to the proton conduction in a solid polymer electrolyte, and the conductivity depends on the water content of the membrane. When the amount of water in the membrane is decreased by a decrease in the humidity of the supply gas or an increase in the operating temperature, the proton conduction resistance is increased to cause a decrease in the performance. Accordingly, in order to obtain a fuel cell with high performance, it is necessary to suitably control the amounts of hydrogen and oxygen and the amount of water in the supply gas.

In the high-temperature range of 100° C. or more, the dehydration rate of the electrolyte membrane is large. In order to maintain the water content of the membrane, it is necessary to supply high-humidity gas. Specifically in the present invention, the relative humidity of at least any one of air or oxygen gas to be supplied to the cathode side or hydrogen gas to be supplied to the anode side in a fuel cell is controlled to 70% or more, preferably 75% or more, more preferably 80% or more, still more preferably 85% or more, thereby the increase in the proton conduction resistance can be inhibited.

On the other hand, in the high-temperature range of 100° C. or more, the saturated water vapor pressure is very large compared with the temperature range of 100° C. or less. Thus, to keep the humidity of the gas equivalent to the humidity in the temperature range of 100° C. or less, the partial water vapor pressure become very large. In order to supply hydrogen and oxygen required for the electrode reactions under such conditions, it is necessary to set the back pressure of the supply gas at a predetermined value or higher. Specifically in the present invention, an increase in the mass transport resistance at the anode and cathode electrodes can be inhibited even in the high electric-current density range by setting the back pressure to 330 kPa or more, preferably 350 kPa or more, more preferably 370 kPa or more, still more preferably 390 kPa or more.

The operating method according to the present invention is effective particularly in cases where the supply gas for the cathode side is air. When the supply gas for the cathode side is air, since the oxygen concentration of the supply gas is decreased to approximately ⅕, the amount of oxygen tends to become small near the electrode. Even under such a situation, a sufficient amount of oxygen can be supplied to the cathode electrode, and a fuel cell having high performance can be obtained by setting the supply pressure of the gas to 330 kPa or more.

EXAMPLES

Below, the present invention will be described in further detail with reference to Examples, but the present invention is not limited to these.

[Synthesis of Electrolyte Membrane]

Synthesis Example 1

Synthesis of 2,2-Bis(4-hydroxyphenyl)-1,3-dioxolane (K-DHBP) represented by the Following General Formula (G1)

[Chemical Formula 2]

(G1)

In a 500 ml flask with a stirrer, a thermometer, and a distilling pipe, 49.5 g of 4,4'-dihydroxybenzophenone, 134 g of ethylene glycol, 96.9 g of trimethyl orthoformate, and 0.50 g of p-toluenesulfonic monohydrate were added and dissolved. Then, the resulting solution was incubated and stirred at a temperature of 78 to 82° C. for 2 hours. Furthermore, the internal temperature was raised gradually to 120° C., and heated until the distillation of methyl formate, methanol, and trimethyl orthoformate stopped completely. This reaction solution was cooled to room temperature, the reaction solution was then diluted with ethyl acetate, the organic layer was washed with 100 ml of an aqueous solution of 5% potassium carbonate and separated, followed by distilling off the solvent. To the residue, 80 ml of dichloromethane was added to precipitate a crystal, and the crystal was filtrated and dried to obtain 52.0 g of 2,2-bis(4-hydroxyphenyl)-1,3-dioxolane. This crystal was analyzed by GC, and found to be 99.8% 2,2-bis(4-hydroxyphenyl)-1,3-dioxolane and 0.2% 4,4'-dihydroxybenzophenone.

Synthesis Example 2

Synthesis of Disodium 3,3'-disulfonate-4,4'-difluorobenzophenone Represented by the Following General Formula (G2)

[Chemical Formula 3]

(G2)

In 150 mL of fuming sulfuric acid (50% SO3) (a reagent from Wako Pure Chemical Corporation), 109.1 g of 4,4'-difluorobenzophenone (a reagent from Aldrich) was allowed to react at 100° C. for 10 hours. Then, the reaction product was added little by little to a large amount of water, the resulting solution was neutralized with NaOH, and then added with 200 g of sodium chloride to precipitate a synthesized product. The obtained precipitation was separated by filtration, and recrystallized with an aqueous ethanol solution to obtain disodium 3,3'-disulfonate-4,4'-difluorobenzophenone represented by the above-mentioned general formula (G2). The purity was 99.3%. The structure was confirmed by 1H-NMR. The impurities were analyzed quantitatively by capillary electrophoresis (for organic substances) and ion chromatography (for inorganic substances).

Synthesis Example 3

Synthesis of Polyether Ketone Polymer Electrolyte Membrane Composed of Polymer Represented by the Following General Formula (G5)

[Chemical Formula 4]

(G5)

In N-methyl pyrrolidone (NMP), 6.91 g of potassium carbonate, 7.30 g of ionic group-containing disodium 3,3'-disulfonate-4,4'-difluorobenzophenone (G2) obtained in the above-mentioned Synthesis Example 2, 10.3 g of hydrolyzable group-containing 2,2-bis(4-hydroxyphenyl)-1,3-dioxolane (G1) obtained in the above-mentioned Synthesis Example 1, and 5.24 g of 4,4'-difluorobenzophenone were polymerized at 210° C.

A solution of the resulting block copolymer dissolved in 25 wt % in N-methyl pyrrolidone (NMP) was filtrated under pressure using a glass-fiber filter, and then applied to a glass substrate by flow casting, and after the substrate was dried at 100° C. for 4 hours, the substrate was heat-treated at 150° C. under nitrogen for 10 minutes to obtain a polyketal ketone membrane. The solubility of the polymer was extremely good. The membrane was immersed in an aqueous solution of 10 wt % sulfuric acid at 95° C. for 24 hours to undergo proton exchange and deprotection reaction. Then the membrane was immersed in a large excess of pure water for 24 hours and washed sufficiently to obtain a polymer electrolyte membrane. The softening point of the resulting polymer electrolyte membrane was measured by dynamic viscoelasticity measurement, and found to be 160° C. The resulting polymer electrolyte membrane had an oxygen gas permeability coefficient of $4.5 \times 10^{11}$ $cm^3 \cdot cm/cm^2 \cdot sec \cdot cmHg$ and a hydrogen gas permeability coefficient of $5.6 \times 10^{10}$ $cm^3 \cdot cm/cm^2 \cdot sec \cdot cmHg$ at 90° C. at 80% RH.

[Production of Membrane Electrode Assembly]

Example 1

An anode catalyst-coated transfer sheet (size: 50×50 mm) and a cathode catalyst-coated transfer sheet (size: 50×50 mm) were arranged on both sides of the polyether ketone polymer electrolyte membrane (thickness: 10 μm; size: 70 mm×70 mm) produced in the above-mentioned Synthesis Example 3, and the resultant was hot-pressed at 160° C. and 4.5 MPa for 5 minutes to produce a catalyst layer-coated electrolyte membrane (CCM). As each of the anode catalyst and the cathode catalyst, a platinum catalyst supported on a carbon support was used.

As shown in FIG. 1 (a cross-sectional view), an anode gas diffusion layer 1a (size: 50 mm×50 mm) and a cathode gas diffusion layer 1b (size: 50 mm×50 mm) were arranged on both sides of the CCM produced as mentioned above. As the anode gas diffusion layer 1a and the cathode gas diffusion layer 1b, a layer, in which a microporous layer containing PTFE and carbon black was formed on a porous carbon sheet ("TGP-H-060", manufactured by Toray Industries, Inc.), was used. The resultant was hot-pressed under conditions of 160° C., 4.5 MPa and 5 minutes to produce a membrane electrode assembly.

Example 2

An anode catalyst layer 2a was formed on a microporous layer, which had been formed on the surface of the anode gas diffusion layer 1a, to produce an anode electrode as a gas diffusion electrode (GDE). A cathode catalyst layer 2b was formed on a microporous layer, which had been formed on the surface of the cathode gas diffusion layer 1b, to produce a cathode electrode as a gas diffusion electrode (GDE). As the anode gas diffusion layer 1a, the cathode gas diffusion layer 1b, the anode catalyst, and the cathode catalyst, the same materials were used as in Example 1. As shown in FIG. 2 (a cross-sectional view), the above-mentioned anode electrode (size: 50 mm×50 mm) and the above-mentioned cathode electrode (size: 50 mm×50 mm) were arranged on both sides of the polyether ketone polymer electrolyte membrane (thickness: 10 μm; size: 70 mm×70 mm) produced in the above-mentioned Synthesis Example 3. The resultant was hot-pressed under conditions of 160° C., 4.5 MPa, and 5 minutes to produce a membrane electrode assembly.

[Evaluation of High-temperature Power Generation (Power Generation Performance)]

The membrane electrode assembly produced by each of the methods described in Example 1 and 2 was set in a JARI standard cell "Ex-1" (electrode area: 25 cm2) manufactured by Eiwa Corporation, and the resulting assembly was used as a module for evaluation of power generation. Hydrogen gas as fuel gas was supplied to the anode electrode on one side, and air as oxidizing gas was supplied to the cathode electrode on the other side. The power generation was evaluated under the following conditions, and the electric current was swept from 0 A/cm2 to 1.2 A/cm2 until the voltage became 0.2 V or less. In the present invention, the voltages at an electric current density of 1 A/cm2 were compared. In this regard, when the membrane electrode assembly was set in the above-mentioned cell, a pressure of 0.7 GPa was loaded.

Electronic load device: electronic load device "PLZ664WA", manufactured by Kikusui Electronics Corp.

Cell temperature: 65° C. and 120° C.

Gas humidification conditions (hydrogen gas and air): 60% RH and 90% RH

Gas back pressure (hydrogen gas and air): 200 kPa and 330 kPa

Ratio of gas utilization: 70% of the stoichiometric amount for the anode and 40% of the stoichiometric amount for the cathode The measurement results are shown in Table 1 below.

TABLE 1

| | Operating Temperature | | | | | | | |
|---|---|---|---|---|---|---|---|---|
| | 65° C. | | | | 120° C. | | | |
| | Humidification Conditions | | | | | | | |
| | 60% | | 90% | | 60% | | 90% | |
| | Gas Back Pressure | | | | | | | |
| | 200 kPa | 330 kPa | 200 kPa | 330 kPa | 200 kPa | 330 kPa | 200 kPa | 330 kPa |
| Example 1 | 0.47 V | 0.50 V | 0.49 V | 0.52 V | 0.34 V | 0.44 V | 0.49 V | 0.60 V |
| Example 2 | 0.46 V | 0.50 V | 0.48 V | 0.51 V | 0.35 V | 0.45 V | 0.48 V | 0.58 V |

As is understood from the Table, as for the membrane electrode assemblies in Example 1 and Example 2, when the operating temperature was increased from 65° C. to 120° VC, the membrane electrode assemblies caused voltage decrease under condition of a relative humidity of 60% at any gas back pressure of 200 kPa or 330 kPa. On the other hand, the membrane electrode assemblies did not cause voltage decrease under condition of a relative humidity of 90% even when the operating temperature was increased from 65° C. to 120° C. Under condition of a back pressure of 330 kPa, the membrane electrode assemblies showed good performance exceeding the power generation performance at 65° C.

[Evaluation of High-Temperature Power Generation (Humidity Dependence)]

A membrane electrode assembly produced by the method described in Example 1 was set in a JARI standard cell "Ex-1" (electrode area: 25 cm2) manufactured by Eiwa Corporation, and the resulting assembly was used as a module for evaluation of power generation. Hydrogen gas as fuel gas was supplied to the anode electrode on one side, and air as oxidizing gas was supplied to the cathode electrode on the other side. The power generation was evaluated under the following conditions, and the voltages were compared while the electric current density was maintained at 1 A/cm2 and the humidity was changed from 30% RH to 95% RH. When the membrane electrode assembly was set in the above-mentioned cell, a pressure of 0.7 GPa was applied.

Electronic load device: electronic load device "PLZ664WA", manufactured by Kikusui Electronics Corp.
Cell temperature: 120° C.
Gas humidification conditions (hydrogen gas and air): 30% RH to 95% RH
Gas back pressure (hydrogen gas and air): 330 kPa
Ratio of gas utilization: 70% of the stoichiometric amount for the anode and 40% of the stoichiometric amount for the cathode The measurement results are shown in Table 2 below.

TABLE 2

| | Operating Temperature 120° C. Gas Back Pressure 330 kPa Humidification Conditions | | | | | | |
|---|---|---|---|---|---|---|---|
| | 30% | 40% | 50% | 60% | 70% | 80% | 90% |
| Example 1 | 0.22 V | 0.27 V | 0.34 V | 0.44 V | 0.55 V | 0.58 V | 0.60 V |

As is understood from the Table, the membrane electrode assembly in Example 1 showed the result that the voltage at 1 A/cm2 was increased as the relative humidity was increased under conditions of an operating temperature of 120° C. and a back pressure of 330 kPa. At 30% RH to 60% RH, the humidity dependence of the voltage was large, whereas at a humidity of 70% RH or more, the humidity dependence of the voltage was small. It is possible to realize stably high performance of power generation by setting the humidity to 70% RH or more.

DESCRIPTION OF SYMBOLS

1a: Anode gas diffusion layer
1b: Cathode gas diffusion layer
2a: Anode catalyst layer
2b: Cathode catalyst layer
3: Electrolyte membrane
4: Membrane electrode assembly (MEA)
5a: Anode separator
5b: Cathode separator
6: Hydrogen gas
6c: Hydrogen gas supply pipe
6d: Hydrogen gas discharge pipe
7: Air
7c: Air supply pipe
7d: Air discharge pipe
10: Fuel cell unit
11: Fuel cell stack
12a, 12b: Humidifier
13a, 13b: Compressor
14a, 14b: Back-pressure valve
15: Temperature sensor
16: Humidity sensor
17: Pressure sensor
18: Hydrogen tank
19: Cooling liquid circulation pump
20: Fuel cell system

The invention claimed is:

1. A method of operating a fuel cell comprising a membrane electrode assembly containing an electrolyte membrane, catalyst layers, and gas diffusion layers, the method including, in a single step, (a) setting an operating temperature of the fuel cell at 100° C. or more, and (b) concurrently setting a relative humidity of a supply gas to be supplied to the fuel cell to 70% or more and a back pressure of the supply gas to 330 kPa or more.

2. The method of operating a fuel cell according to claim 1, wherein said supply gas is air or oxygen gas to be supplied to the cathode side in said fuel cell, and/or hydrogen gas to be supplied to the anode side in said fuel cell.

3. The method of operating a fuel cell according to claim 2, wherein said supply gas is air to be supplied to the cathode side in said fuel cell.

4. The method of operating a fuel cell according to claim 1, wherein said electrolyte membrane contains a solid polymer electrolyte.

5. The method of operating a fuel cell according to claim 4, wherein said solid polymer electrolyte contains a proton-conductive polymer.

6. The method of operating a fuel cell according to claim 5, wherein said proton-conductive polymer is a hydrocarbon polymer.

7. The method of operating a fuel cell according to claim 1, wherein said electrolyte membrane has a softening point of 120° C. or more.

8. The method of operating a fuel cell according to claim 1, wherein the oxygen gas permeability coefficient of said electrolyte membrane at 90° C. and 80% RH is $1.0 \times 10^{-9}$ $cm^3 \cdot cm/cm^2 \cdot sec \cdot cmHg$ or less.

9. The method of operating a fuel cell according to claim 1, wherein the hydrogen gas permeability coefficient of said electrolyte membrane at 90° C. and 80% RH is $5.0 \times 10^{-9}$ $cm^3 \cdot cm/cm^2 \cdot sec \cdot cmHg$ or less.

10. The method of operating a fuel cell according to claim 1, wherein one of said catalyst layers contains an oxide support.

11. A fuel cell system for use in the method of operating a fuel cell according to claim 1, the fuel cell system comprising a fuel cell including a membrane electrode assembly containing an electrolyte membrane, catalyst layers, and gas diffusion layers; a humidifier for humidifying supply gas to be supplied to said fuel cell; and a compressor for increasing the back pressure of said supply gas.

12. The method of operating a fuel cell according to claim 1, wherein the operating temperature of said fuel cell is 120° C. or more, and setting the relative humidity of the supply gas to 90% or more.

13. The method of operating a fuel cell according to claim 1, wherein one of said gas diffusion layers contains a carbon sheet and a microporous layer.

* * * * *